United States Patent [19]

Christie et al.

[11] 4,329,939
[45] May 18, 1982

[54] FLOORING UNIT

[75] Inventors: Thomas D. Christie, Calgary, Canada; Robert K. Ballantine, Mullalloo Perth, Australia; Pierre A. Moreau, Calgary, Canada

[73] Assignee: BCM Manufacturing Ltd., Calgary, Canada

[21] Appl. No.: 164,196

[22] Filed: Jun. 30, 1980

[30] Foreign Application Priority Data

May 22, 1980 [CA] Canada .................................. 352499

[51] Int. Cl.³ ............................ A01K 1/00; E04B 5/06
[52] U.S. Cl. ........................................ 119/28; 52/602
[58] Field of Search .............. 119/16, 20, 28; 52/177, 52/180, 309.4, 602

[56] References Cited

U.S. PATENT DOCUMENTS

| 3,039,575 | 6/1962 | Graham | 52/578 |
| 3,397,676 | 8/1968 | Barney | 119/15 |
| 3,613,605 | 10/1971 | Holdredge, Jr. | 108/58 |
| 3,680,495 | 8/1972 | Pike | 108/53 |
| 3,771,495 | 11/1973 | Stevenson et al. | 119/17 |
| 3,905,334 | 9/1975 | Stevenson | 119/20 |
| 4,041,669 | 8/1977 | Rauenhorst | 52/309.4 X |

FOREIGN PATENT DOCUMENTS

| 102599 | 2/1926 | Austria | 119/28 |
| 1071041 | 2/1980 | Canada | 119/28 |
| 2806341 | 8/1979 | Fed. Rep. of Germany | 119/28 |
| 131264 | 6/1978 | German Democratic Rep. | 119/28 |
| 579343 | 9/1976 | Switzerland | 119/28 |

*Primary Examiner*—Robert Peshock
*Assistant Examiner*—Robert P. Swiatek
*Attorney, Agent, or Firm*—Rogers, Bereskin & Parr

[57] ABSTRACT

A flooring unit for hog barns and the like is disclosed. The unit is a one-piece structural foam moulding having a tread surface formed with longitudinal rows of slots for permitting animal droppings and the like to pass through the unit. The unit is reinforced at its underside by a plurality of longitudinal and transverse reinforcing webs.

10 Claims, 5 Drawing Figures

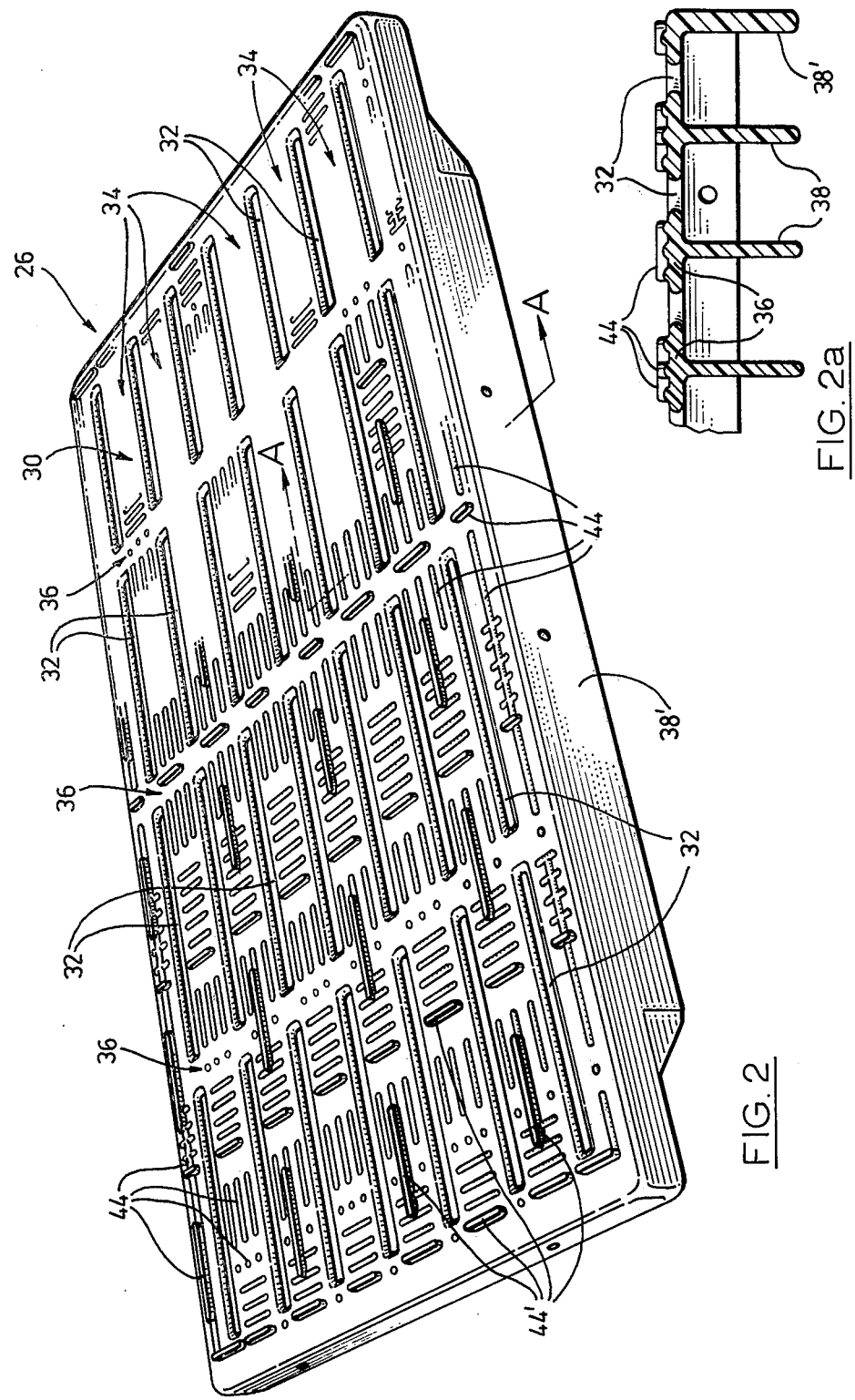

FLOORING UNIT

This invention relates generally to flooring for barns, pens and like enclosures for animals. In particular, the invention has been devised in connection with flooring for hog barns and calf pens, although there is no limitation in this respect.

Hog barn flooring has traditionally been constructed from steel or wooden members which are arranged in spaced parallel positions so as to define slots therebetween through which droppings and other waste material can pass. However, flooring of this form has a number of disadvantages. For example, the animal droppings have a severe deleterious effect on the flooring members, causing corrosion of steel members and rotting of wooden members. Also, bacteria often tends to grow on wooden flooring members in the moist environment of a hog barn, with obvious consequent risks to animal health. Steel flooring members have the further problem that they have the effect of rapidly conducting heat away from animals on the flooring. In the case of young animals in particular, this can be a severe problem in cold climatic conditions.

U.S. Pat. No. 3,983,668 to Hassman (corresponding to Canadian Pat. No. 989,134) discloses a flooring member suitable for hog barns and the like which is made by a pultrusion process from glass fibre reinforced polyester materials. The flooring member is generally T-shaped in cross-section. In practice, a flooring surface is constructed by connecting together a plurality of the flooring members in spaced parallel positions using clips. A problem with this type of flooring is that the clips tend to "creep" along the flooring members in use due to the vibrations produced by almost continual movement of animals on the flooring, with the result that the flooring may fail when the clips have moved to a position at which two or more flooring members are effectively disconnected from one another.

An object of the present invention is to provide improvements in flooring for animal enclosures aimed at overcoming these problems.

According to the invention there is provided a flooring unit for an animal enclosure, comprising a unitary moulding in a plastic material which has relatively high heat insulating properties and which is substantially unaffected by animal droppings. The moulding defines a generally rectangular tread surface formed with a plurality of slots, all of which extend in a longitudinal direction of the tread surface. The slots are arranged in a plurality of longitudinal rows separated by longitudinal portions of said tread surface of significantly greater width than the slots. Each row includes a plurality of slots which are aligned transversely of the tread surface with corresponding slots in adjacent rows and which are separated from one another by at least one transverse portion of the tread surface. The moulding further includes a plurality of reinforcing webs extending downwardly below said tread surface and including a plurality of longitudinal webs and at least one transverse web integrally coupled to said longitudinal webs. These longitudinal webs are disposed one below of each of said longitudinal surface portions and includes two webs disposed adjacent respectively opposite sides of the unit. The transverse web is disposed below the transverse tread surface.

In order that the invention may be more clearly understood, reference will now be made to the accompanying drawings which illustrate a preferred embodiment of the invention by way of example, and in which:

FIG. 2 is a perspective view from above of one of the flooring units shown in FIG. 1;

FIG. 2a is a sectional view on line A—A of FIG. 2;

Figure 1:
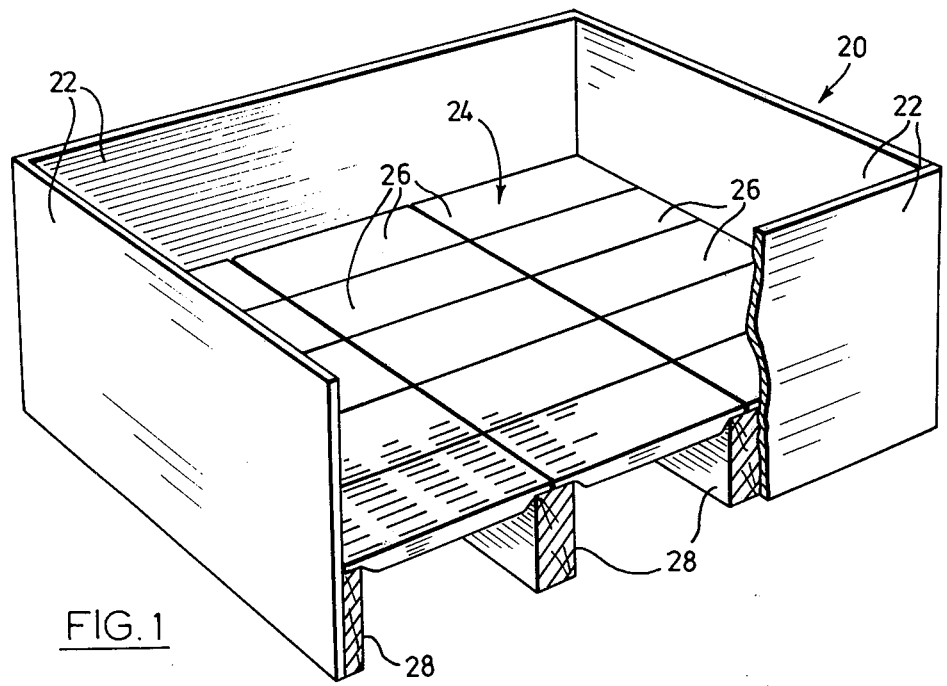
FIG. 1 is a somewhat diagrammatic illustration of a hog pen having a flooring surface made up of flooring units according to the invention, part of one wall of the pen being broken away to show the manner in which the flooring units are supported.

Referring first to FIG. 1, a hog pen is generally indicated at 20 and includes four walls 22 and a floor 24 formed by a plurality of flooring units of the form provided by the invention. The units are individually designated by reference numeral 26 and are assembled to form a complete floor surface of rectangular shape. The flooring units are supported by a plurality of wooden beams 28 which extend transversely of the pen. Apart from the flooring units 26, the remainder of the pen will be of essentially conventional construction and will not therefore be described in detail since it forms no part of the present invention. For present purposes, it is sufficient to note that the walls 22 constrain hogs in the pen and that droppings and other waste material can fall through the flooring units into the spaces between the beams 28.

Figure 3:
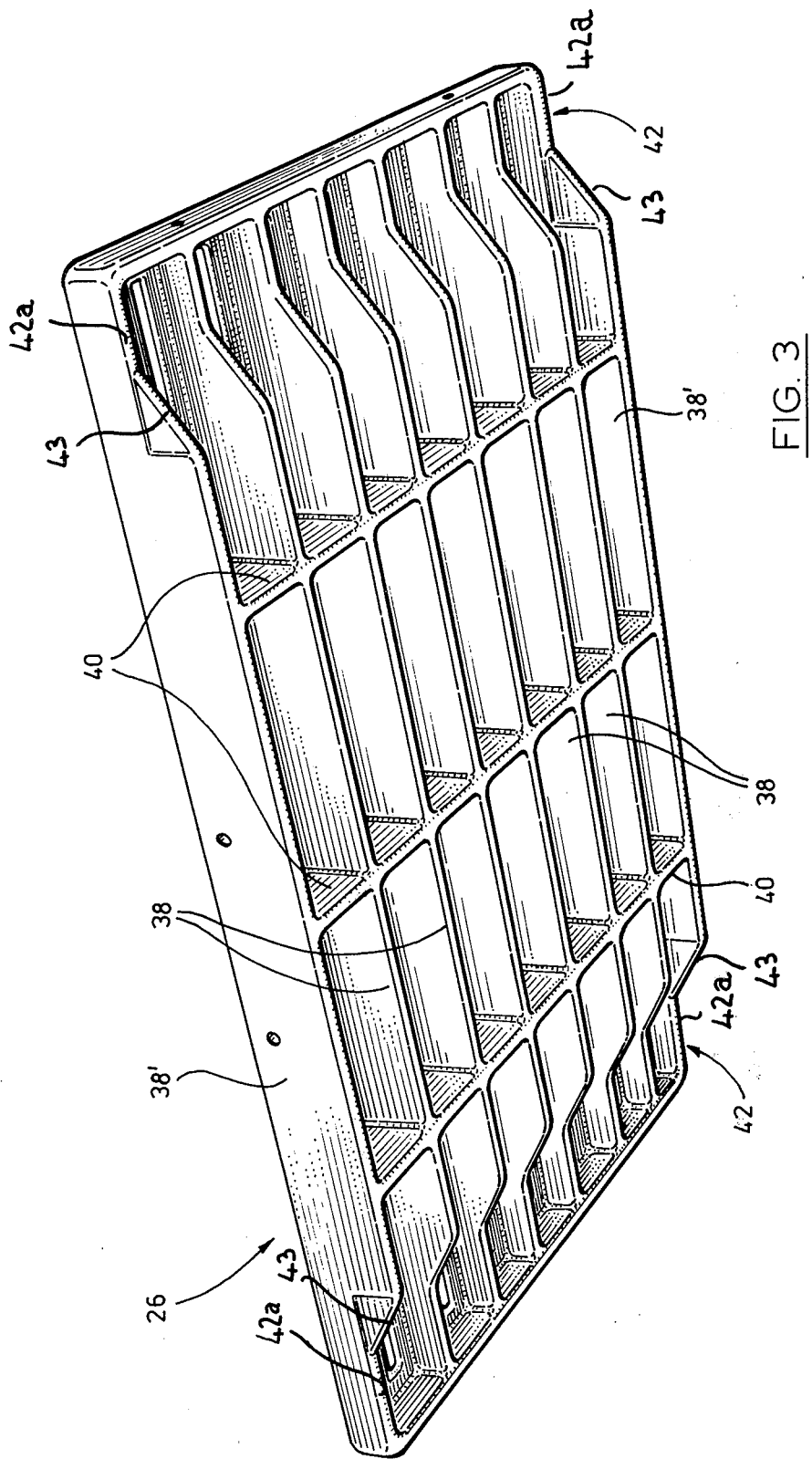
FIG. 3 is an underneath perspective view corresponding to FIG. 2.

FIGS. 2, 2a and 3 show one of the flooring units 26 in detail. The unit is a one-piece moulding in a plastic material which has relatively high heat insulating properties and which is substantially uneffected by animal droppings. The moulding defines a generally rectangular tread surface 30 (FIG. 2) formed with a plurality of slots 32 all of which extend in a longitudinal direction of the tread surface. The slots are arranged in a plurality of longitudinal rows separated by longitudinal portions 34 of the tread surface which are of significantly greater width than the slots themselves. Each row includes a plurality of slots which are aligned transversely of the tread surface with corresponding slots in adjacent rows and which are separated from one another by three transverse portions 36 of the tread surface. It will be seen that, in this particular embodiment, there are seven longitudinal rows of slots and that each row includes four slots. While the invention is not limited in this regard, it has been found that this particular slot arrangement is convenient for a particular size of flooring unit (see later) in that it allows sufficient slot area for passage of waste material through the unit, while at the same time maintaining sufficient strength in the unit itself.

The plastic moulding further includes a plurality of reinforcing webs which extend downwardly below the tread surface as best illustrated in FIG. 3. With particular reference to that view, it will be seen that the moulding includes longitudinal webs 38 and transverse webs 40 which are integrally coupled to the longitudinal webs. The longitudinal webs are disposed one below each of the longitudinal tread surface portions 34 (FIG. 2) and also include two webs 38' disposed adjacent respectively opposite sides of the flooring unit. These webs are also visible in FIG. 2. The transverse ribs 40 are disposed one below each of the transverse tread surface portions 36 of the unit.

It has been found that this arrangement of webs is particularly advantageous in that it results in a flooring unit of extremely high strength having substantial resistance to both longitudinal and transverse bending forces and also to torsional forces which might tend to cause the unit to twist. From a practical viewpoint, such a flooring unit must have extremely high strength characteristics if it is to be able to resist the loads which will be imposed on it by animals in use. Thus, while the flooring unit might well be used with advantage for young animals, the unit must also be capable of supporting fully grown hogs and other animals.

With continued reference to FIG. 3, it will be seen that the transverse ribs 40 extend right to the side edges of the unit and that the longitudinal ribs 38 and 38' extend right up to the end edges of the unit and are shaped to define support portions 42 at the ends of the unit which are of reduced depth, and locating shoulders 43. When the flooring units are installed, these end portions 42 rest on supporting beams such as those shown at 28 in FIG. 1. While it is not essential within the broad scope of the invention to shape the longitudinal reinforcing webs in this manner, it will be appreciated from FIG. 2 that this shaping of the webs has the advantage that each flooring unit is located against longitudinal movement when installed between two support beams by abutment of the shoulders 43 with the beams. Obviously, the units cannot in any event move significantly when they are all installed as shown in FIG. 1, but this web shaping does assist in locating the units during installation. The support portions 42 are each of a length approximately equal to half of the width of one of the supporting beams, so that longitudinally adjacent units can be butted together end to end, and each portion has a lower surface 42a for resting on the relevant beam. The longitudinal webs 38 and 38' impart sufficient strength to the flooring unit that longitudinal support beams are not required. The webs 38' at the sides of each unit abut the corresponding webs of adjacent units in use.

Flooring unit 26 is a structural foam moulding. While it is not essential to use a moulding of this form within the broad scope of the invention, structural foam has a number of advantages compared with other forms of moulding, including reduced weight and cost, combined with high strength and good heat insulation properties. A polypropylene moulding is employed in this particular embodiment and has the advantage of a plastic "memory" which allows the unit to return to its original shape after deformation (by the weight of an animal). Polyethelene may also be used although with some increase in weight to compensate for inferior creep properties. In this connection, "creep" is defined as the slow deformation of a material under stress at temperatures within or above its usual operating range.

Structural foam moulding is a well-known technique in which a foaming agent is introduced into the raw resin of a plastic material to form a cell structure; in a particular embodiment, baking powder was used as the foaming agent with polypropylene resin. However, since the technique is well-known, it is believed unnecessary to provide further description at this stage. Suffice it to say that a polypropylene structural foam moulding has been found eminently suitable for the flooring unit in that it combines many desirable features including high strength, good heat insulating properties, resistance to bacteria growth and resistance to deterioration under the effects of animal droppings.

Referring now more particularly to FIG. 2, it will be seen that the tread surface 30 of the flooring unit is provided with a plurality of upwardly protuberant anti-slip ribs generally denoted 44. For convenience of illustration, ribs have been shown on part only of the tread surface although in fact they cover the surface. The ribs are of varying lengths and extend both longitudinally and transversely of the unit for inhibiting slippage in both directions. The particular rib arrangement shown is not believed to be critical to the invention. However, it has been found advantageous to arrange some of the highest ribs in groups of four, in which each group defines a "pocket" of a size approximating the size of the foot of an animal which will be supported on the unit. Four such ribs defining one of these "pockets" have been accentuated in FIG. 2 and indicated by reference numeral 44'. While it is obviously ridiculous to suggest that an animal will stand with its feet deliberately placed in these "pockets", it has been found in practice that the provision of such "pockets" does have a significant effect on preventing animals slipping on the tread surface.

Figure 4:
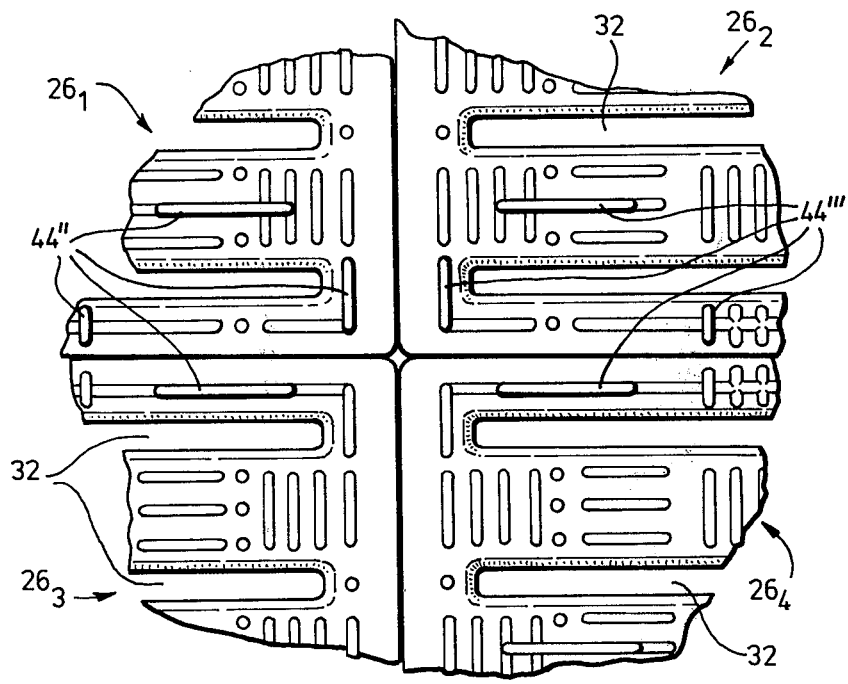
FIG. 4 is a plan view showing parts of four adjacent ones of the flooring units shown in FIG. 1.

FIG. 4 shows portions of four laterally adjacent flooring units as in pen 20. The units are denoted respectively as $26_1$, $26_2$, $26_3$ and $26_4$. Two groups of the pocket-defining ribs on the tread surfaces of the respective units are visible at 44" and 44"', and it will be seen that the ribs are deliberately arranged to define the "pockets" referred to above even across a junction between adjacent flooring units.

FIG. 2a is a sectional view which shows the cross-sectional shapes of the reinforcing webs 38 at the underside of the unit. The webs taper slightly towards their lower ends to assist in release of the unit from the mould in manufacture although they are essentially parallel sided. In any event, each rib is shaped to define a substantially T-shaped cross-section with the associated longitudinal portion 36 of the tread surface 30 between laterally adjacent ones of the slots 32. This cross-sectional shape has been found to provide high strength combined with economy of material although other cross-sectioned shapes could be employed in other embodiments. With continued reference to FIG. 2a, it should also be noted that the edges defining the slots 32 in the unit are provided with large radius convex edges so as to avoid any sharp edges which might injure an animal.

By way of example, typical suitable dimensions for one particular form of the flooring unit provided by the invention are as follows:

Overall length 24 inches
Overall width 12 inches
Thickness of end portions 42, 1 inch
Length of end portions 42, 2 inches
Height of ribs 38, 38' and 40, 2 inches
Length of slots 32, $4\frac{3}{4}$ inches adjacent the ends of the unit, $5\frac{1}{4}$ inches adjacent the centre
Width of slots 32, $\frac{3}{8}$ inches.

It is of course to be understood that these dimensions are given by way of example only and are not to be considered as limiting the scope of the invention.

We claim:

1. A modular flooring unit for an animal enclosure, the unit being adapted to be removably supported on a pair of parallel support beams and to co-operate with other similar units to form a flooring surface in said enclosure, the unit comprising a unitary moulding in a plastic material having relatively high heat insulating properties and which is substantially unaffected by animal droppings, the moulding defining a generally rectangular tread surface formed with a plurality of slots, all of which extend in a longitudinal direction of the tread surface, the slots being arranged in a plurality of longitudinal rows separated by longitudinal portions of said tread surface of significantly greater width than said slot and each said row including a plurality of slots which are aligned transversely of the tread surface with corresponding slots in adjacent rows, and which are separated from one another by at least one transverse portion of said tread surface, and wherein the moulding further includes a plurality of reinforcing webs extending downwardly below said tread surface and including a plurality of longitudinal webs which extend from end to end of the unit and at least one transverse web integrally coupled to said longitudinal webs, said longitudinal webs being disposed one below each of said longitudinal tread surface portions and including two webs disposed adjacent respectively opposite sides of the unit, and said at least one transverse web being disposed below said at least one transverse tread surface portion; and wherein said longitudinal webs are shaped to define portions adjacent respectively opposite ends of the unit which are of reduced depth compared with the remainder of said webs, said portions extending inwardly over a pre-determined distance and defining respective lower surfaces for resting on a said beam, and locating shoulders adapted to co-operate with said respective beams for locating the unit in its longitudinal direction.

2. A unit as claimed in claim 1, wherein said tread surface is provided with a plurality of upwardly protuberant ribs for inhibiting slippage of animals on said unit.

3. A unit as claimed in claim 2, wherein some of said ribs are arranged to define on said tread surface a plurality of pockets shaped to approximate the shape of the foot of an animal to be supported on said unit.

4. A unit as claimed in claim 1, in which the transverse dimension of the unit is equal to approximately one half of the longitudinal dimension of the unit.

5. A unit as claimed in claim 4, wherein said transverse dimension is 12 inches and said longitudinal dimension is 24 inches, and wherein said ribs are all approximately 2 inches in height.

6. A unit as claimed in claim 1, wherein each of said longitudinal rows of slots includes four said slots, whereby the unit includes three transverse tread surface portions and three transverse reinforcing webs each disposed below one of said transverse tread surface portions.

7. A unit as claimed in claim 1, comprising seven said longitudinal rows of slots, whereby the unit includes six longitudinal tread surface portions between said rows of slots and eight longitudinal reinforcing webs.

8. A unit as claimed in claim 1, wherein said plastic moulding is a structural foam.

9. A unit as claimed in claim 8, wherein said structural foam is a polypropylene foam.

10. An animal enclosure having a floor surface formed by an assembly of modular, rectangular flooring units individually removably supported on a plurality of parallel beams, the units being disposed in parallel rows with the units in each row in abutting side by side relationship with adjacent units in the same row and abutting end to end relationship with the units of an adjacent row, each unit being supported adjacent opposite ends thereof on adjacent ones of said beams with a common beam supporting the opposed ends of the units in two adjacent rows, each said unit comprising a unitary moulding in a plastic material which has relatively high heat insulating properties and which is substantially uneffected by animal droppings, the moulding defining a tread surface and a plurality of reinforcing webs which extend downwardly below said tread surface and which include a series of spaced parallel webs extending in a longitudinal direction of the unit and from end to end thereof, and at least one web which is integrally coupled to and extends generally normally with respect to said parallel webs, wherein said tread surface is formed with a plurality of openings which extend through the moulding at positions displaced from the positions of said webs so that animal droppings can pass through the mouldings when the unit is in use, and wherein said longitudinal webs are shaped to define portions adjacent respectively opposite ends of the unit which are of reduced depth compared with the remainder of said webs, said portions extending inwardly over a predetermined distance corresponding substantially to half the width of said common beam and defining respective lower surfaces for resting on a said beam, and respective locating shoulders adapted to co-operate with said beams for locating the unit in its longitudinal direction, said units being free of physical attachment to said beams whereby the units can be individually removed by lifting from the beams.

* * * * *